United States Patent [19]

Cunningham et al.

[11] 3,783,749
[45] Jan. 8, 1974

[54] CAM FOLLOWER PISTON

[75] Inventors: Sinclair Upton Cunningham; James Rutherford Wells; Donald Firth, all of Glasgow, Scotland

[73] Assignee: National Research Development Corporation, London, England

[22] Filed: Sept. 2, 1971

[21] Appl. No.: 177,265

[30] Foreign Application Priority Data
June 3, 1971  Great Britain................... 18,903/71

[52] U.S. Cl...................... 92/249, 91/488, 92/181, 92/255
[51] Int. Cl................................ F16j 1/02, F16j 1/10
[58] Field of Search................... 92/172, 181, 240, 92/242, 248, 249, 243, 255, 244, 256, 253; 91/491–498, 488; 29/156.5; 308/216

[56] References Cited
UNITED STATES PATENTS

| | | |
|---|---|---|
| 1,728,591 | 9/1929 | Brauer............................ 92/258 X |
| 2,954,992 | 10/1960 | Baker............................ 264/242 X |
| 3,186,352 | 6/1965 | Anderson........................ 91/506 X |
| 3,191,264 | 6/1965 | Underwood et al. ............. 287/87 X |
| 3,259,963 | 7/1966 | White ............................ 264/242 X |
| 3,319,537 | 5/1967 | Pittman........................... 92/243 X |
| 3,331,288 | 7/1967 | Kolthoff, Jr...................... 91/507 |

*Primary Examiner*—Irwin C. Cohen
*Attorney*—Cushman, Darby & Cushman

[57] ABSTRACT

A piston adapted to carry a cam follower and particularly for use as a ball or roller piston in a hydrostatic pump or motor, comprises a piston body having a seating at one end, an insert of low friction material which is shaped to provide in the seating a bearing for the cam follower, and means for securing the insert to the piston body. The piston body preferably has a recess or aperture communicating with the seating and the insert of low friction material extends into or through the recess or aperture to lock the insert to the piston body. The insert is conveniently made of polytetrafluorethylene, nylon or an acetal material.

6 Claims, 10 Drawing Figures

CAM FOLLOWER PISTON

The present invention relates to a piston adapted to carry a cam follower and is concerned in particular, but not exclusively, with ball or roller pistons for use in hydrostatic pumps or motors of rotary or linear types.

A hydrostatic machine is one in which the mechanical output (in the case of a motor) or the mechanical input (in the case of a pump) is a function of the pressure (and thus potential energy) of the working fluid rather than its velocity (and kinetic energy).

In a conventional ball piston hydrostatic machine, each piston comprises a ball which is a close sliding fit in a cylinder bore to which the working fluid, such as oil, is admitted and from which it is exhausted. The balls operate as cam followers, engaging a cam track which moves relative to the cylinders in which the ball pistons reciprocate.

At low rates of reciprocation of the ball piston, oil leakage past the ball can rise to a significant proportion of the total amount fed to the cylinder. As the ball must be free to rotate within the cylinder to act as a cam follower, it is not possible to reduce the oil leakage by providing any form of pressure seal on the ball.

It has been proposed previously to provide an auxiliary piston to reduce the leakage past the ball, and this has taken the form of a substantially rigid disc having a sliding fit in the cylinder bore of the ball piston, and providing a seating for the ball. It has proved difficult in such an arrangement to reduce the friction between the disc and the ball.

In accordance with the present invention there is provided a piston comprising a piston body having a seating at one end, an insert of low friction material which is shaped to provide in the seating a bearing for a cam follower and means for securing the insert to the piston body.

Preferably the means for securing the insert to the piston body is provided by the shape of the insert and/or the seating, the shape of the insert and/or the shape of the seating being such that the insert is locked to the piston body by co-operation with the seating.

Preferably the piston body has a recess or aperture communicating with the seating and the insert of low friction material extends into or through the recess or aperture, the shape of the insert and/or the shape of the recess or aperture being such that the insert is locked to the piston body by its extension into or through the recess or aperture.

Alternatively or in addition, the securing means may comprise projections projecting from the seating into the insert.

Preferably the piston body has an aperture which extends from the seating to an end face of the piston body remote from the seating the insert extending into the aperture. The said insert may have a flange extending over at least part of the said end face of the piston body. That part of the insert which extends through the said aperture may have a passageway leading from the said end face of the piston body to the surface of the bearing in the seating, and allowing lubrication of the bearing in operation.

In accordance with one aspect of the invention the said piston body has with an aperture extending from the seating to the said end face of the body remote from the seating or to the side wall of the piston body, the said insert extending through the said aperture and forming around the perimeter of the said end face or side wall of the piston body a sealing ring adapted to engage the inner face of a bore within which the piston is fitted in operation.

Thus the aperture may extend axially of the piston body to the end face of the body remote from the seating, or may extend at right angles to the axis of the piston body, and form the seal in a circumferential groove in the wall of the piston body.

Where the piston body has an aperture which extends from the seating to the end face of the piston body remote from the seating, the insert may consist of a bearing portion shaped to provide the bearing, a stem portion extending through the aperture, and a securing portion in the region of the end face of the piston body at least two of the said portions being separately formed portions secured together after the stem portion has been inserted in the aperture.

The stem portion may be formed integrally with the bearing portion, and the securing portion may be welded to the stem portion. Alternatively, the insert may be secured to the piston body by a screwed fastener, providing screw threaded fastening means, spring clip, or other mechanical means attaching on to the stem portion, and holding the bearing portion into the piston body. Further alternatively the insert may be fixed to the piston body by an adhesive or the stem portion may be deformed by heat or pressure or otherwise so as to lock the bearing insert into the piston body.

Thus there may be provided a method of making a piston including the steps of inserting in a piston body having a seating at one end and an aperture leading from the seating to the other end of the piston body, an insert of low friction material consisting of a bearing portion fitting into the seating and providing a bearing for a cam follower and a stem portion extending through the aperture, and securing the stem portion at the end remote from the bearing in such a manner as to lock the insert to the body.

A further alternative means of fixing the insert into the piston is by shaping the stem portion so that it acts as a clip enabling the bearing portion to be snapped into the piston body.

It is preferred that the said insert is of synthetic plastics material. Conveniently the said insert may be made of polytetrafluorethylene, nylon, or an acetal material such as "Delrin" or "Kemetal".

The cam follower provided in operation in the said seat may be a ball, as for example in the case of a ball piston hydrostatic machine, or may be a roller.

The present invention is related to an improved cam follower piston disclosed in a co-pending U.S. application based on U.K. application 18903/71.

Embodiments of the invention will now be described by way of example with reference to the accompanying drawings in which.

Figure 1:
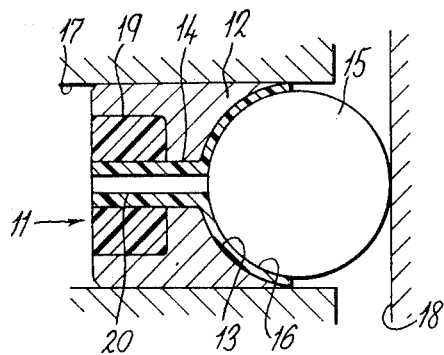
FIG. 1 is an axial section of a ball piston for a hydrostatic machine, and embodies the present invention.

In FIG. 1 there is shown a piston for a ball piston hydrostatic pump or motor. The piston 11 comprises a piston body 12 having a seating 13 at one end of the piston body, and an aperture 14 extending from the seating 13 axially of the piston body 12 to the other end thereof. The seating 13 is shaped to receive a ball cam follower 15, and the seating 13 is lined by an insert 16 which forms a bearing for the ball 15. In operation, the piston 11 reciprocates in a cylinder bore 17 under the action of a cam track 18 which is engaged by the ball 15. When used in a hydrostatic machine, the bore 17 is filled with a working fluid such as oil.

The insert 16 is preferably of plastics material and is of substantially lesser friction relative to metal than the piston body 12, which is conveniently of metal, as is the ball 15. The insert 16 extends through the aperture 14 and fills a recess 19 in the end face of the body 12 remote from the seating 13. The diameter of the recess 19 is greater than that of the aperture 14, so that the insert 16 is mechanically locked in position in the piston body 12. The insert 16 has a lubrication hole 20 along the axis of the body communicating between the seating 16 and the end face of the body remote from the seating.

Preferably a low friction plastics material such as polytetrafluorethylene is used and is injection moulded.

Figure 2:
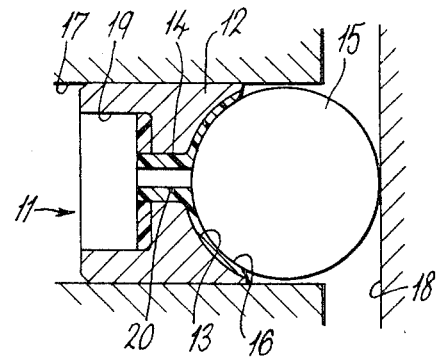
FIGS. 2, 3 and 4 are sections of modifications of the piston shown in FIG. 1.
Figure 3:
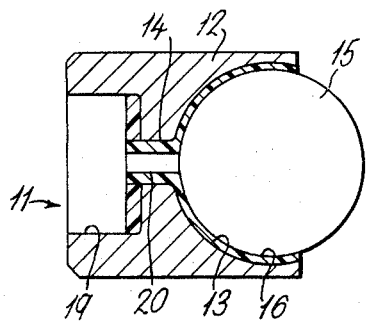
Figure 4:
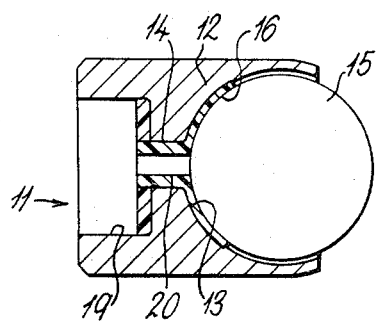

FIGS. 2, 3 and 4 show modifications of the piston of FIG. 1. In FIG. 2, the piston body diameter is only slightly larger than the diameter of the ball 15 to minimise stresses between the ball and the cam. In FIG. 3 the ball 15 is moulded into the piston body so that it is retained by the insert 16. In FIG. 4 the end of the piston body 12 surrounding the seating 13 is rolled over the ball to retain the ball 15.

Figure 5:
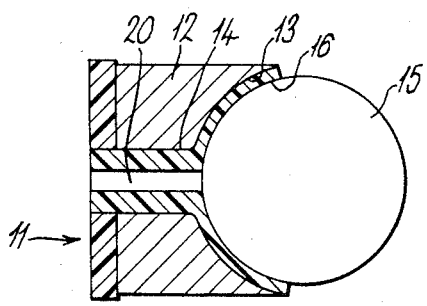
FIG. 5 is a section of modification of the piston of FIG. 1, in which an insert in the body of the piston provides a piston seal respectively.

FIG. 5 illustrates a modification of the piston of FIG. 1 in which the insert 16 extends over the whole of the face of the piston body remote from the seating 13, with the exception of the lubrication channel 20. The perimeter 23 of the insert 16 at the end remote from the seating 13 is arranged to provide a seal against the wall of the cylinder bore 17.

Figure 6:
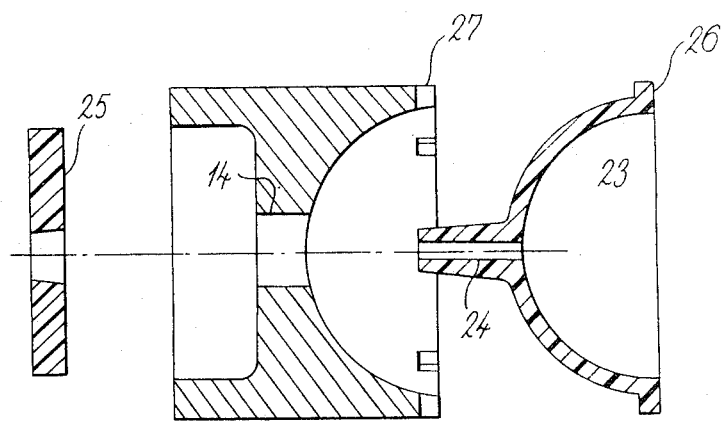
FIGS. 6 to 9 illustrate further modified pistons.
Figure 6A:
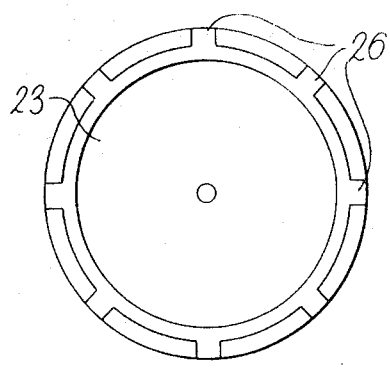

With reference to FIGS. 6 and 6(a) there will now be further described a piston of similar construction to that of FIG. 1. The insert comprises two initially separate parts consisting of a bearing portion 23, a stem portion 24 and a flange portion 25. The insert is assembled by pushing the stem portion 24 into the aperture 14, fitting the flange portion 25 in the recess 19, and welding the flange portion 25 to the stem portion 29.

Castellations 26 and 27 are provided in both the piston body and the bearing portion 23 which prevent the insert from rotating.

This arrangement has a number of advantages in certain circumstances over the injection moulding method described hereinbefore.

The metal pistons are not inserted into the injection moulding machine, so that the cost of the injection moulded parts is much reduced.

Allowance can be made for the contraction of the plastics material so that the insert can be made a good fit in the piston body.

The pistons can be cold formed and castellations can be put in by this process.

Figure 7:
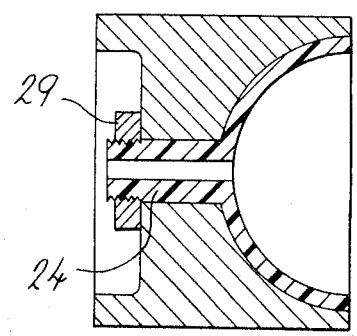
Figure 8:
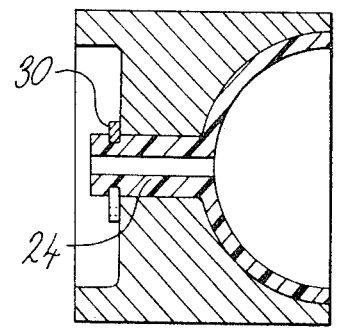
Figure 9:
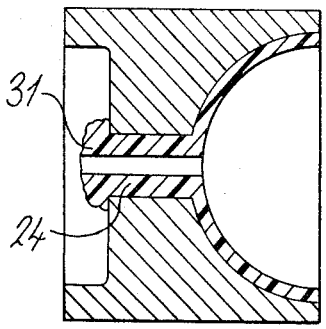

FIGS. 7 to 9 show modifications of the piston of FIG. 6, and like reference numerals are used for like elements in the Figures.

In FIG. 7 the stem portion 24 is secured by a screw threaded fastening means comprising a nut 29. In FIG. 8 the stem portion 24 is secured by a spring clip 3, and in FIG. 9 the end of the stem portion 24 remote from the seating 13 is secured by heat or pressure deformation at 31.

Although the invention has been described by way of example with regard to the provision of an aperture or recess in the seating to lock the insert in position, it will be appreciated that the seating of the piston body may be shaped with protuberances or castellations extending into the insert of low friction material to effect locking of the insert to the piston body.

We claim:

1. A piston for a hydrostatic machine comprising:
a freely rotating cam follower member for following a cam surface in a hydrostatic machine by reciprocatory motion of the cam follower member in a cylindrical bore of the machine;
a piston body for reciprocatory travel along said cylinder bore, said piston body having at one end a working face for exposure to the working fluid of said hydrostatic machine, and at the other end a seating face defining a seating for said cam follower member, but exposing a portion of said cam follower member protruding from said piston body to engage a cam surface, said piston body having an aperture extending from said seating to said working face of said piston body;
an insert of low friction synthetic plastics material positioned between said cam follower member and said seating in said piston body and having an internal bearing surface for said cam follower member, said insert having a stem portion which extends through said aperture in said piston body and locates said insert in said piston body, and a separately formed locking portion, means securing said locking portion to said stem portion, and said locking portion extending around the perimeter of said working face to form a sealing ring engaging the inner face of said bore.

2. A piston according to claim 1 in which the stem portion is formed integrally with the bearing portion, and said securing means comprises a welded connection.

3. A piston according to claim 1 in which said securing means comprises a screw threaded fastening means.

4. A piston according to claim 1 in which said securing means comprises a heat or pressure deformation connection.

5. A piston according to claim 1 in which said securing means comprises an adhesive.

6. A piston according to claim 1 in which the said insert is made of a material selected from the group consisting of polytetrafluorethylene, nylon or acetal material.

* * * * *